Figure 1:
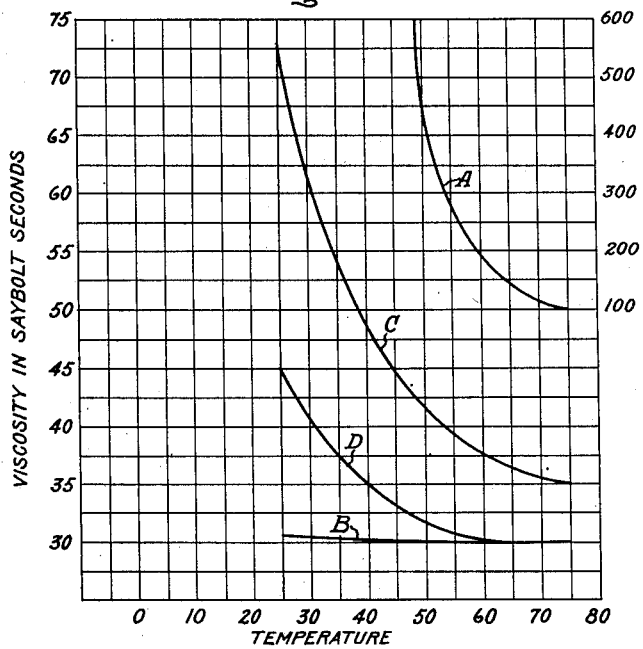

Oct. 17, 1933.  F. M. CLARK  1,931,455
DIELECTRIC MATERIALS FOR ELECTRICAL DEVICES
Filed April 2, 1931  3 Sheets-Sheet 1

Inventor:
Frank M. Clark,
by *Charles E. Mullen*
His Attorney.

Oct. 17, 1933.  F. M. CLARK  1,931,455
DIELECTRIC MATERIALS FOR ELECTRICAL DEVICES
Filed April 2, 1931   3 Sheets-Sheet 2

Inventor:
Frank M. Clark,
by *Charles V. Tullar*
His Attorney.

Oct. 17, 1933.   F. M. CLARK   1,931,455
DIELECTRIC MATERIALS FOR ELECTRICAL DEVICES
Filed April 2, 1931   3 Sheets-Sheet 3

Inventor:
Frank M. Clark,
by *Charles V. Miller*
His Attorney.

Patented Oct. 17, 1933

1,931,455

UNITED STATES PATENT OFFICE 1,931,455

DIELECTRIC MATERIALS FOR ELECTRICAL DEVICES

Frank M. Clark, Pittsfield, Mass., assignor to General Electric Company, a corporation of New York Application April 2, 1931. Serial No. 527,204

18 Claims. (Cl. 252—1)

The present invention relates to electrical devices such, for example, as transformers, capacitors, switches, cables, electric bushings, fuses and the like, which are adapted to the use of liquid dielectric material, either alone, or in conjunction with paper, or other non-conducting solid materials.

Heretofore, mineral oil, a paraffinic or naphthenic hydrocarbon, has been most commonly used when a liquid dielectric material was desired. However, some of the properties of mineral oil constitute a serious disadvantage in electrical apparatus. For example, mineral oil, when subjected to the decomposing influence of an electric arc gives off inflammable gases, which are explosive when mixed with air. In some instances dangerous explosions have occurred in transformers. Mineral oil is an inflammable liquid and, therefore, constitutes a fire hazard quite apart from its being a source of explosive gases. Mineral oil also tends to become partially oxidized or sludged during use and then must be replaced. Its dielectric constant is relatively low, being about 2.2. This fact especially limits its use for capacitors.

A liquid material free from these disadvantageous properties of mineral oil and possessing desirable electrical and other characteristics for use as a dielectric medium in electrical apparatus has long been sought in the electrical art. Various materials suggested as substitutes for oil, such as carbon tetrachloride, for example, have been found unsuitable. In many cases such materials proved to be chemically unstable under working conditions and attacked metal and other materials in the devices in which they were used. In other cases deleterious or explosive gases were evolved by an electric arc formed under service conditions in contact with such dielectric material.

I have discovered that various halogenated cyclic (aryl) hydrocarbons, or mixtures of halogenated cyclic hydrocarbons, which are liquid in the temperature range in which electrical devices are operated (about —25° C. to 75° C.) possess the desired combination of properties required for dielectric media.

Such halogenated hydrocarbons have sufficient chemical stability to permit copper and other chemically reactive metals to be unattacked by the halogen element even under the conditions of electric stress existing in such electric devices as transformers, switches, capacitors, cables, and the like.

Cyclic hydrocarbons when properly halogenated are non-combustible in the usual sense. Furthermore, a dielectric comprising one or more halogenated cyclic hydrocarbons containing halogen and hydrogen in properly chosen proportions, generate only non-combustible gas or gases when subjected to the influence of an electric arc. Such dielectric media are non-sludging, have a high dielectric constant and have a combination of various other advantageous properties, hereinafter described, which render them peculiarly adapted for insulating and cooling purposes in electrical devices.

In the case of cyclic hydrocarbon compounds, or mixtures, containing chlorine as the halogen element in amounts at least chemically equivalent to the hydrogen present, the gas given off consists either wholly, or substantially so, of hydrogen chloride. Similarly, hydrocarbons containing fluorine, bromine or other halogen, in proper proportion when subjected to an electric arc generate the respective halogen hydride. Halogen hydrides are non-combustible. They may be absorbed by chemical combination with alkaline materials, and dissolved in water and other liquids. The various advantages of such dielectric media a substantial proportion of which consists of halogenated polyphenyl compound and another halogenated cyclic compound will be described in greater detail in connection with specific examples of such compounds which may be employed in various electrical devices in accordance with my invention.

In the present application claims are made covering a composition of matter which is adapted particularly for insulating and cooling use in electric apparatus. In co-pending application Serial No. 569,692, filed October 19, 1931, as a division of the present application, claims are made covering an electrical device, in particular an electrical transformer, containing a new dielectric, or cooling and insulating material, as herein described. In application Serial No. 555,570, filed August 9, 1931 as a continuation in part of my prior application Serial No. 425,358, filed February 1, 1930, claims are made to a capacitance device containing a new dielectric material as herein described.

Figure 2:
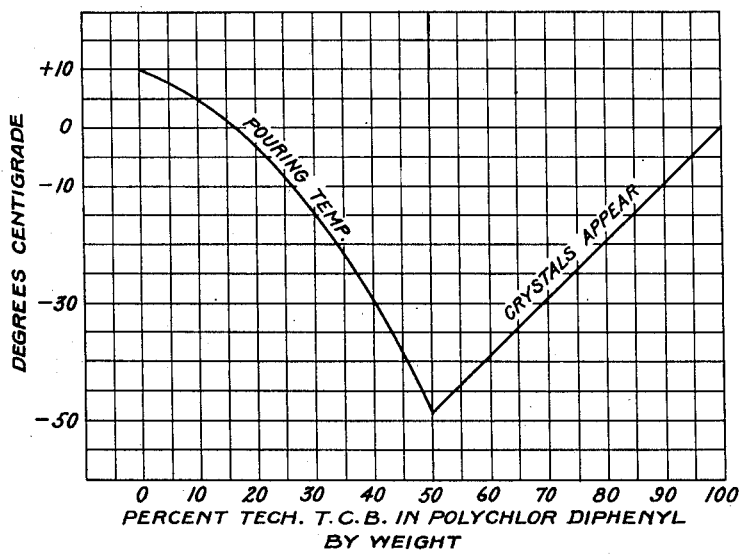
Figure 3:
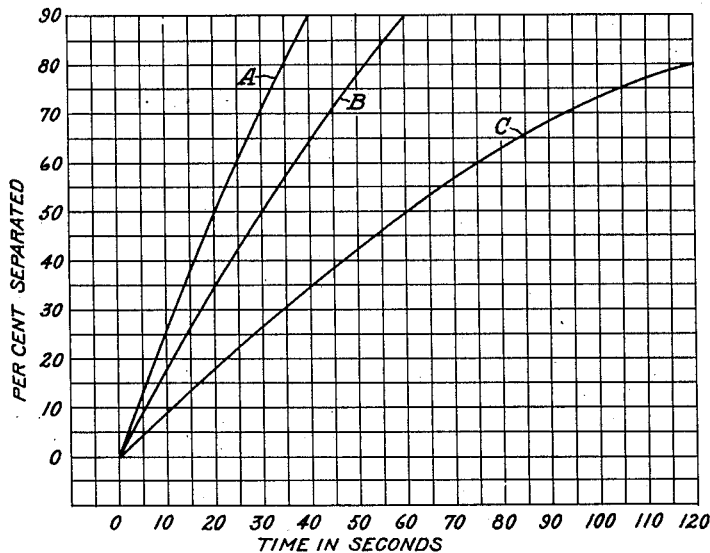
Figure 4:
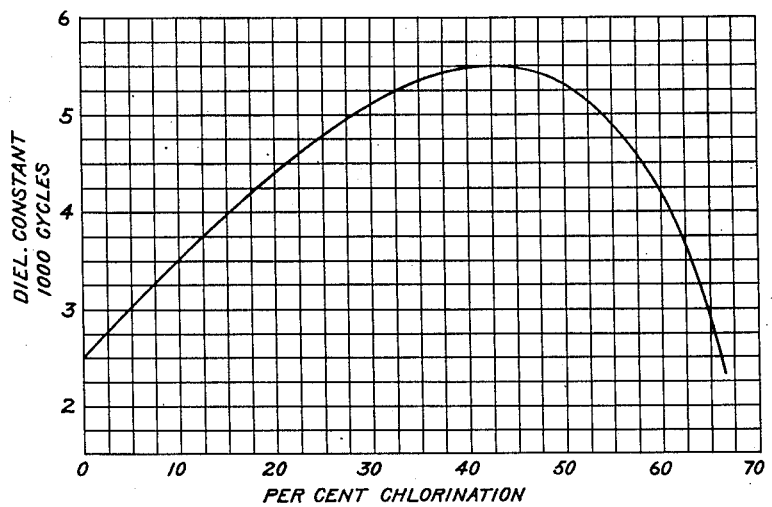
Figure 5:
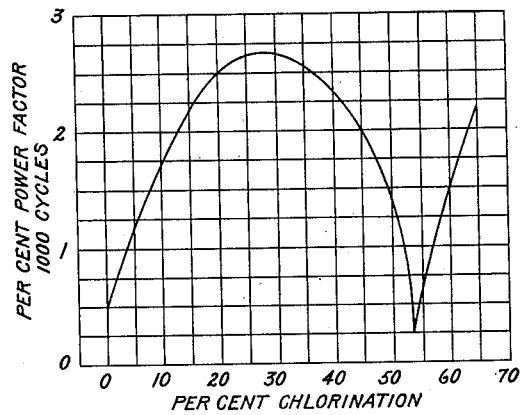
Figure 6:
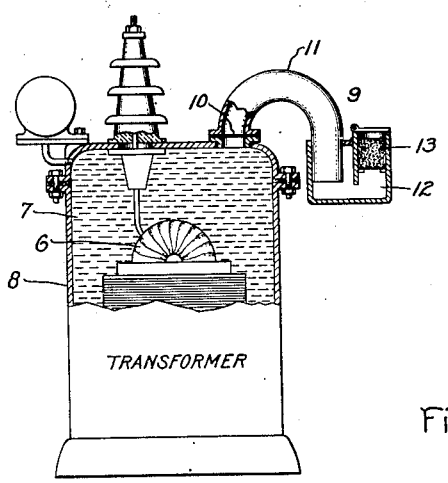
Figure 7:
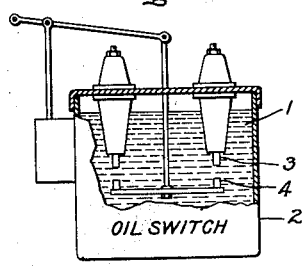
Figure 8:
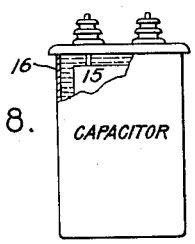

The accompanying drawings graphically illustrate some of the physical properties rendering halogenated hydrocarbons of peculiar suitability for the purposes of my invention. Fig. 1 is a graph indicating the viscosity at different temperatures of several examples of my new dielectric materials; Fig. 2 is a graph indicating liquidity or capability of flowing at different temperatures of mixtures constituting preferred examples of my invention; Fig. 3 is a graph indicating the rate of de-emulsification of water and described halogenated hydrocarbon compounds; Fig. 4 is a graph indicating dielectric constant for different degrees of chlorination of a preferred class of compounds; Fig. 5 is a graph indicating the relative power factor of diphenyl and its various chlorination products; Fig. 6 is a side elevation of a transformer containing halogenated hydrocarbon as a dielectric and being provided with absorbing means; Figs. 7 and 8 illustrate respectively a power switch and a capacitor, as examples of different forms of electrical devices embodying my invention.

Example I

In accordance with one embodiment of my invention, liquid chlorinated diphenyl, and preferably a mixture of the various isomers of pentachlor diphenyl, may be employed as a dielectric material for electrical devices, examples of which are illustrated in Figs. 6, 7 and 8. This material is non-volatile under working conditions, is inert chemically and is non-inflammable. It may be obtained by the chlorination of diphenyl which may be carried out by known methods. Diphenyl may be caused to react with chlorine gas in the presence of a catalyzer. Free hydrochloric acid and chlorine may be removed, if present in the product, by washing with an aqueous alkaline solution and then distilling the product preferably under reduced pressure.

I prefer to use a chlorination product containing about 54% chlorine, which is the theoretical proportion of chlorine in pentachlor diphenyl, although the mixture employed may contain some lower and some higher chlorination products. While the material chemically may be termed a pentachlor diphenyl, as ordinarily produced without especial purification, it consists of a mixture of the various isomers of pentachlor diphenyl. This is an advantage as such a mixture remains liquid at a lower temperature than a material consisting of a single isomer. For some purposes, notably capacitors, the most favorable percentage of 54 per cent. may be departed from somewhat, 50 to 60 per cent. being the preferred range. This material has a viscosity temperature relation as indicated by curve A, Fig. 1, in which the viscosities in seconds Saybolt are plotted as ordinates and the temperatures in degree centigrade are plotted as abscissæ. The ordinates for curve A are indicated at the right-hand scale of the diagram. The mixture becomes too viscous for pouring between about 0° C. and +10° C. depending on the exact chemical composition. For comparison purposes the viscosity of ordinary transformer oil is given in lower scale units (left-hand scale) by curve C.

The purified material has a dielectric constant at room temperature of about 5. The resistance at 100° C. of the material when free from contamination is about $1 \times 10^{12}$ ohms per centimeter cube or higher. Its power factor at room temperature is about .05%.

For some purposes the relatively high viscosity of pentachlor diphenyl may be disadvantageous. Such an instance may be a transformer or a power switch in which low viscosity is advantageous because of desired circulation or desired mobility of parts. In such case I prefer to modify the material as described below. The isomeric mixture of pentachlor diphenyl is particularly well adapted for capacitors and cables as later described in connection with Figs. 4 and 5.

Example II

Trichlor benzene constitutes a second example of a halogenated cyclic hydrocarbon which may be employed as a dielectric in accordance with my invention. This material is also preferably used as a mixture of its isomers prepared by the direct chlorination of benzene with a catalyst. Such a mixture has a viscosity of 30 seconds Saybolt at 50° C. and becomes solidified at about +5° C. It is substantially non-volatile at the operating temperature of electric devices operated with a liquid dielectric and is stable chemically. Its viscosity characteristics are indicated by curve B. Trichlor benzene has a dielectric constant at room temperature of about 5. Trichlor benzene because of its low viscosity is of especial value in transformers and other electrical apparatus in which free flow of the liquid is desired, either for heat dissipation or for mechanical reasons, as in a switch.

In Fig. 3, curve A indicates the readiness with which water separates from trichlor benzene, the percentage of water separated being plotted as ordinates against time in seconds as abscissæ. Curve C indicates for comparison purposes the rate of emulsified transformer oil and water separating under the same conditions. The rate of de-emulsification of water from trichlor benzene is seen to be materially greater than the rate for transformer oil. For example, at the end of forty seconds about thirty-five per cent of emulsified water has separated from the oil and about ninety per cent of emulsified water has separated from the trichlor benzene.

Trichlor benzene having equal molecular proportions of chlorine and hydrogen is non-inflammable and such gases as are evolved by an arc are small in quantity and non-combustible and non-explosive.

In a copending application Serial No. 614,196 filed May 28, 1932, claims have been made on a liquid composition comprising chlorinated benzene compounds which is adapted for use as a dielectric material in electrical apparatus.

Example III

For many purposes of my invention, it is advantageous to employ a mixture of pentachlor diphenyl and trichlor benzene, preferably in substantially equal proportions by weight. I have found that such a mixture possesses the properties of a super-cooled liquid which is still capable of being poured at a temperature as low as —48° C. The mixture will remain non-crystalline at temperatures down to approximately —70° C.

The graph shown in Fig. 2 illustrates the minimum pouring temperatures and the maximum temperatures at which crystals appear as a function of the ratio of the above two compounds.

In determining the minimum pouring temperature or the temperature at which crystals appear, about 45 c.c. of the liquid was placed in a bottle 1⅜ inches in diameter and approximately 3 inches tall. With a thermometer held in place by a close fitting stopper, the mixture was cooled by suitable means with careful observation until crystallization is noticed or until on being held horizontally the mixture will no longer flow.

For many purposes of my invention mixtures of pentachlor diphenyl and trichlor benzene have physical properties superior as a dielectric material to mineral oil. For example, they have a lower viscosity at room temperature than the mineral oil commonly used for transformers, switches, and similar electrical devices, and, of course, the mixture is non-inflammable and does not evolve inflammable or explosive gases.

In Fig. 1 curve D (left-hand scale ordinates) indicates the temperature-viscosity relation of a mixture of equal parts by weight of pentachlor diphenyl and trichlor benzene.

The dielectric constant of a mixture of a pentachlor diphenyl and trichlor benzene regardless of proportion is about 5. Such a high constant produces a better equalization of electric strains in electric devices than does mineral oil, with its dielectric constant of about 2.25. Electrical creepage tests show the mixture to be substantially twice as good an insulator as mineral oil, also regardless of proportions.

It has a lower affinity for water than mineral oil. For example, as shown in Fig. 3, curve B, an emulsion of water in a mixture of equal parts of pentachlor diphenyl and trichlor benzene becomes de-emulsified in 60 seconds to the extent of about 90%.

All such mixtures have a materially lower solubility for air, or other gas, than mineral oil. As compared with mineral oil, such as employed in transformers, the improvements in the case of the equal parts mixture is about 60%.

As is evident from Fig. 1, curve D, the halogenated mixture is materially less viscous than mineral oil at a given temperature and, therefore, is better suited as a cooling medium. A less viscous liquid is better able to circulate in an electric device and convection currents are formed therein with greater facility.

The mixture also is less viscous than pentachlor diphenyl and at temperatures above 60° C. has about the same viscosity as trichlor benzene. The operating temperature of electrical devices, such as transformers, is about 65 to 75° C. Transformers operated out of doors in cold climates may be subjected to temperatures as low as —25° C. or even lower. The temperatures to which transformers are subjected indoors will ordinarily range between 0° C. and 75° C.

Expansion of such a mixture, due to changes of temperature, is less than the expansion of mineral oil of the same temperature range.

An electric switch, such as shown for example in Fig. 7, containing as a dielectric material 1, a mixture of pentachlor diphenyl and trichlor benzene, contained in a receptacle 2, shows less loss of material from the electrodes 3, 4 when subjected to the arc produced when breaking a circuit, than observed under similar conditions in mineral oil. Materially less gas is given off for a given amount of arcing in trichlor benzene than in mineral oil. In pentachlor diphenyl the amount of gas given off is substantially the same as for mineral oil. For mixtures of these two materials the amount of gas given off therefore is less than in the case of mineral oil. I have found in a given case a given amount of arcing in trichlor benzene liberated two cubic centimeters of gas; in diphenyl chloride liberated in ten cubic centimeters of gas; and in an equal parts mixture of said compounds liberated five to six cubic centimeters of gas.

When either pentachlor diphenyl, trichlor benzene, or a mixture of these materials in any proportion, is subjected to an electric arc, the gas given off is substantially solely hydrogen chloride.

Hydrogen chloride gas may be readily absorbed by alkaline chemical reagents, such as soda lime. In the transformer shown in Fig. 6 having windings 6 immersed in a chlorinated dielectric 7 contained in a receptacle 8, an absorber 9 is provided having a frangible diaphragm 10 at its inlet. If arcing occurs and gas is liberated, the diaphragm 10 is ruptured and the hydrogen chloride gas passes through a conduit 11 into an absorbing chamber 12 containing a charge 13 of soda lime, or similar basic material. A similar absorber may be used in connection with a power switch, such as shown in Fig. 7, or other electric devices, which may be otherwise hermetically sealed.

In an application Serial No. 689,426 filed September 14, 1933 as a division of the present application, claims have been made on this feature of my invention which involves the combination of a gas absorber with an electrical device.

*Example IV*

Under some circumstances it is desirable to employ as a dielectric medium a material which, while non-inflammable and evolving only non-explosive gases when subjected to an arc, has a composition which is such that when the material is subjected to an arc some free chlorine is disengaged. This is especially the case when such a medium is used for electrical apparatus in conjunction with carbonizable insulating substances, such as paper. When such carbonizable substances are subjected to an electric arc, hydrogen and carbon monoxide are generated which are explosive if air is present.

Under such circumstances, it is preferable to employ hexachlor diphenyl, as a dielectric material, preferably as a mixture of its isomers. The combined chlorine in this compound is in chemical excess of the hydrogen. The excess chlorine by chemical combination with the hydrogen eliminated from the paper by the arc, removes a potential source of gaseous explosions. The amount of carbon monoxide evolved from paper under arcing in the presence of these chlor products is not sufficient to reach explosive proportions. In ordinary cases the proportion of hydrogen chloride in the gases will be greater than 50 per cent. Even with only 20 per cent of hydrogen chloride present and 30 per cent carbon monoxide, the balance of 50 per cent being air, the mixture is non-explosive. Hexachlor diphenyl is quite viscous, having a higher pour point than the pentachlor product. This handicaps its use in transformers and switches. To overcome this handicap, I may employ a mixture as described in the next example.

*Example V*

Hexachlor diphenyl may be employed advantageously in combination with trichlor benzene, preferably in 50:50 proportions by weight. Such mixtures possess essentially the same physical characteristics as described above in connection with the pentachlor diphenyl mixtures with trichlor benzene. For transformers, cables, capacitators and other apparatus containing carbonizable materials, such a mixture is preferred as a dielectric liquid.

*Example VI*

In some cases equimolecular mixtures of hexachlor diphenyl and dichlor benzene may be employed. The dichlor benzene, however, is more volatile than the trichlor benzene, boiling at about 170° C. and hence such a mixture is less advantageous in the case of apparatus operating at elevated temperatures. The excess of chlorine from the hexachlor diphenyl combines with the excess hydrogen from the dichlor benzene under arcing conditions and produces a non-explosive gas consisting essentially of hydrogen chloride.

*Example VII*

Many of the benefits of my invention may be employed with halogen-containing dielectric materials which, when subjected to arcing, will evolve mixed with the halogen hydrides some combustible gas. Depending on the proportion of combustible gas, such mixtures are either non-explosive, or in any event less apt to produce destructive results when explosive. An example of such an embodiment of my invention is a dielectric for use in transformers, or other electrical devices, comprising diphenyl oxide $(C_6H_5)_2O$, sufficiently highly halogenated to at least contain a molecular amount of chlorine equivalent to its hydrogen content, which is about 51% in the case of chlorine. It may be used either alone or in combination with other halogen products, such as trichlor benzene.

Pentachlor diphenyl oxide, or a mixture of isomers of pentachlor diphenyl oxide having chemically equivalent quantities of chlorine and hydrogen, is non-inflammable, and when subjected to arcing produces hydrogen chloride. However, the oxygen present in the compound also results in the production of some carbon monoxide, making this material either alone or in combination with trichlor benzene somewhat less advantageous as a dielectric than the above described other chlorinated diphenyl products. Because of its high dielectric constant and a viscosity which is lower than that of the pentachlor diphenyl, the pentachlor diphenyl oxide is well adapted to be used as a dielectric for capacitors and cables.

While the previous examples describe mainly dielectric media consisting of chlorinated products, other halogenated products may be used for the purpose of my invention. For example, the fluorine, bromine or iodine derivatives of benzene, diphenyl or other aromatic hydrocarbons may be used. Mixed halogenated materials may be employed.

When employing halogenated aryl hydrocarbons in electrical devices, such as transformers or cables which contain also other insulating materials, such as resins, asphalts, oil varnishes, gums or the like, care should be exercised to exclude such materials as are attacked by the halogenated liquid. For example, the asphalts and oil varnishes should not be used. Synthetic resins, such as the phenolic or alkyd resins (polyhydric alcohol—polybasic acid resins), and the copal gums may be safely used as impregnating or coating materials.

As a further example of the advantages accruing from the new dielectric materials constituting my invention, I shall refer to electric capacitors, containing chlorinated diphenyl and preferably pentachlor diphenyl. Although such capacitors may assume various forms, I shall refer particularly to results obtained with capacitors (Fig. 8) having electrodes 15 consisting of aluminum foil and containing three layers of interposed paper dielectric each of 0.0004'' thickness (not shown). Such capacitors are impregnated with pentachlor diphenyl, preferably mixtures of isomers, by first thoroughly drying the paper in the electrode assembly, preferably in a vacuum, and then admitting in a vacuum to the dried assembly in a container 16 the desired impregnating mixture. The capacitors also may be impregnated without previous drying and without the use of vacuum by immersing them for 2 or 3 hours in the chlor diphenyl composition which is heated to a temperature of about 150° C. to 160° C. After draining, the container 16 may be sealed to exclude air.

The benefits or advantages of my invention in the capacitor field will be apparent from the following comparative figures.

A paper insulated capacitor designed for operation at low voltage (440 volts or less) having cubical dimensions of 3½'' x 4¼'' x 5'' has been impregnated with mineral oil a capacitance of 18 microfarads. When such a dielectric assembly is impregnated with a liquid chlor-diphenyl mixture of 54% chlorine content and containing predominantly isomers of pentachlor diphenyl, or with a mixture of pentachlor diphenyl and trichlor benzene or trichlor benzene alone, its capacity is found to have been increased to about 28 to 29 microfarads, which is an increase of about 55 to 60%. As shown in Fig. 5, pentachlor diphenyl, as a mixture of its isomers, is particularly well suited for use as a dielectric in capacitors because of its low power factor. In this figure the power factor (dielectric energy loss) of diphenyl and its chlorinated products is indicated for different degrees of chlorination, the ordinates being power factor for 1000 cycles and the abscissæ representing diphenyl and chlorination products up to about 65 per cent chlorine content. At about 54% chlorine content, the power factor of the chlorination products is a minimum. This percentage of chlorine corresponds to the pentachlor diphenyl. As a dielectric in capacitors, the pentachlor diphenyl hence will have a minimum of power losses for alternating current use. Capacitors containing paper dielectric impregnated with pentachlor diphenyl are characterized by a power factor less than 0.25 per cent.

As shown by Fig. 4, this lower power factor is obtained with but little sacrifice of dielectric constant. Figure 4 indicates the dielectric constant plotted as ordinates, as a function of degree of chlorination plotted as abscissæ. The dielectric constant is near its maximum at about 40 to 45% chlorine content. A pentachlor with a chlorine content of about 54 per cent has dielectric constant within ten per cent of the maximum.

If no increase of dielectric capacity is desired, the size of the capacitor may be reduced when impregnated with the chlorinated materials mentioned. For example, a one microfarad capacitor when oil treated has a cubical dimension of 4.1 cu. in. When impregnated with pentachlor diphenyl, or the others mentioned above, a one microfarad capacitor of corresponding dielectric thickness need have a size of only 2.6 cu. in.

The improvement in capacitors effected by using chlorinated diphenyl, or the other chlorinated products mentioned, as the dielectric liquid not only improves the usefulness of capacitors in their present fields of application but renders practicable the commercial operation of capacitors with certain types of electric motors. For example, with a high torque alternating current motor, it is highly desirable to employ a high capacitance to assist in the starting of the motor.

For use with 220 and 440 volt motors of this type, capacitors containing suitable chlorinated diphenyl as a dielectric are particularly adapted because of their relatively low cost and small bulk. Such capacitors, of course, are also suitable for use in various other power fields, in the radio field, and in general with obvious advantages in other fields of application in which capacitors are employed.

As a generic term to designate both compounds of diphenyl and diphenyl oxide I have herein employed the term polyphenyl compound.

What I claim as new and desire to secure by Letters Patent of the United States, is,—

1. A composition of matter comprising a mixture containing substantial proportions respectively of halogenated compounds of benzene and diphenyl, said composition containing halogen in sufficiently high proportion to render gases evolving in case of decomposition to be substantially non-inflammable.

2. A composition of matter comprising a mixture containing substantially equal amounts respectively of halogenated compounds of benzene and a polyphenyl, said composition containing halogen and hydrogen in substantially equimolecular proportions.

3. A composition of matter comprising a mixture containing substantial proportions respectively of chlorine compounds of benzene and diphenyl, said composition containing a sufficiently high proportion of chlorine to render gases evolved therefrom by decomposition to be substantially non-inflammable.

4. A composition of matter comprising a mixture of substantially equal parts by weight of trichlor benzene and hexachlor diphenyl.

5. A composition of matter comprising a mixture of substantially equal parts by weight of trichlor benzene and pentachlor diphenyl.

6. An insulating and cooling composition for electrical apparatus comprising a mixture containing substantial proportions respectively of pentachlor diphenyl and another chlorinated cyclic compound, the combining weight of chlorine being equal at least to the combining weight of hydrogen in said mixture.

7. A composition of matter comprising a mixture including substantial proportions respectively of halogenated benzene and halogenated diphenyl oxide, the molecular content of halogen in said mixture being equal at least to the molecular content of hydrogen.

8. A composition of matter comprising substantial proportions respectively of trichlor benzene and pentachlor diphenyl oxide.

9. A dielectric material consisting preponderantly of a mixture of halogenated cyclic compounds, one ingredient of said mixture being halogenated diphenyl, said mixture containing a sufficiently high proportion of halogen to render gases evolved therefrom by the decomposing effect of an electric arc to be non-inflammable.

10. A dielectric material comprising a mixture of halogenated cyclic compounds which include a substantial proportion of halogenated polyphenyl and a substantial proportion of halogenated benzene, the halogen and hydrogen content of said material being in substantially equimolecular ratio.

11. A dielectric material consisting preponderantly of a liquid mixture of chlorinated compounds of the cyclic series, one ingredient of said mixture being chlorinated diphenyl, said mixture containing a sufficiently high proportion of chlorine to render gases evolved therefrom by the decomposing effect of an electric arc to be non-inflammable.

12. A dielectric material which is liquid over a wide range of ordinary temperatures comprising both chlorinated polyphenyl and chlorinated benzene in substantial proportions respectively, said mixture containing a sufficiently high content of chlorine to render gases which may be evolved therefrom by decomposition to be non-inflammable.

13. A liquid composition of matter containing substantial amounts respectively of halogenated benzene and a halogenated polyphenyl, the halogen content and hydrogen content of said composition being in such ratio that upon thermal decomposition such gas as may be evolved is non-combustible.

14. A composition of matter which is liquid at temperatures materially below 0° C. containing substantial amounts respectively of chlorinated compounds of benzene and diphenyl, the chlorine content and hydrogen content of said composition being in substantially equimolecular ratio, whereby such gas as may be evolved upon decomposition of said composition will be substantially non-inflammable.

15. A composition of matter containing substantial amounts respectively of trichlorbenzene and pentachlordiphenyl, said composition being liquid at temperatures materially below 0° C.

16. A liquid dielectric composition containing a substantial proportion of halogenated polyphenyl compound and a substantial proportion of halogenated benzene compound whereby the solidifying temperature of said composition is made lower than it would be in the absence of said second compound.

17. A liquid dielectric composition containing a substantial proportion of chlorinated diphenyl and a substantial proportion of chlorinated benzene compound whereby the solidifying temperature of said composition is made lower than it would be in the absence of said second compound.

18. An insulating and cooling composition for electrical apparatus containing substantial amounts respectively or hexachlor diphenyl and trichlorbenzene.

FRANK M. CLARK.

CERTIFICATE OF CORRECTION.

Patent No. 1,931,455.  October 17, 1933.

FRANK M. CLARK.

It is hereby certified that error appears in the printed specification of the above numbered patent requiring correction as follows: Page 4, line 92, for "been" read when; page 5, line 134, claim 18, for "or" read of; and that the said Letters Patent should be read with these corrections therein that the same may conform to the record of the case in the Patent Office.

Signed and sealed this 28th day of November, A. D. 1933.

F. M. Hopkins (Seal) Acting Commissioner of Patents.